US012742359B2

(12) United States Patent
Mittelstädt et al.

(10) Patent No.: US 12,742,359 B2
(45) Date of Patent: Sep. 22, 2026

(54) HYDRAULIC SPIDER TUBULAR CENTERING SYSTEMS AND METHODS FOR USE THEREOF

(71) Applicant: FORUM US, INC., Houston, TX (US)

(72) Inventors: Rumen Mittelstädt, Hamburg (DE); Arne Pross, Hamburg (DE)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 18/814,183

(22) Filed: Aug. 23, 2024

(65) Prior Publication Data

US 2026/0055673 A1 Feb. 26, 2026

(51) Int. Cl.

*E21B 19/10* (2006.01)
*E21B 19/24* (2006.01)
*E21B 33/04* (2006.01)
*F16L 3/00* (2006.01)

(52) U.S. Cl.

CPC .............. *E21B 19/10* (2013.01); *E21B 19/24* (2013.01); *E21B 33/0422* (2013.01); *F16L 3/00* (2013.01)

(58) Field of Classification Search

CPC ...... E21B 19/10; E21B 19/24; E21B 33/0422; F16L 3/00
See application file for complete search history.

(56) References Cited

U.S. PATENT DOCUMENTS 1,676,275 A 7/1928 Montgomery
2,068,217 A * 1/1937 Abegg .................... E21B 19/10 188/67
2,234,489 A * 3/1941 Garrison ................. E21B 19/10 188/67
3,029,488 A * 4/1962 Knighis .................. E21B 19/10 279/71
3,571,865 A 3/1971 Johnson
3,670,603 A * 6/1972 Hawkins ................. E21B 19/18 81/52
3,833,073 A * 9/1974 Carver .................... E21B 10/48 175/173
5,351,767 A 10/1994 Stogner et al.
5,468,121 A 11/1995 Stogner
5,944,319 A 8/1999 Kohlman
6,212,976 B1 4/2001 Stogner
6,598,501 B1 * 7/2003 Schulze-Beckinghausen .............. E21B 19/16 81/57.21
7,013,759 B1 3/2006 Childress, II
(Continued)

FOREIGN PATENT DOCUMENTS

CA 2122623 C 5/1993

OTHER PUBLICATIONS

Extended European Search Report for Application No. 25193302.4 dated Nov. 21, 2025.

*Primary Examiner* — Neel Girish Patel

(57) ABSTRACT

A tubular centralizer including a housing, a guide plate, and a pin. The housing has a plurality of adjustment pin holes. The guide plate is at least partially disposed within the housing and movable between a retracted position and an extended position. The guide plate includes a plurality of adjustment pin slots. The pin is positioned in a first adjustment pin hole of the plurality of adjustment pin holes, and in a first adjustment pin slot of the guide plate. A length of the first adjustment pin slot within which the pin is positioned sets a limit of the extended position and the retracted position of the guide plate.

19 Claims, 10 Drawing Sheets

(56) References Cited

U.S. PATENT DOCUMENTS 7,117,938 B2 10/2006 Hamilton et al.
7,134,531 B2 11/2006 Ramey et al.
7,398,833 B2 7/2008 Ramey et al.
7,510,033 B2 3/2009 Lutzhoft et al.
7,891,469 B1 * 2/2011 Sipos ...................... E21B 19/10 188/67
8,061,418 B2 11/2011 Angelle et al.
8,079,627 B2 12/2011 Lutzhoft et al.
8,783,137 B2 7/2014 Hamilton
9,057,225 B2 6/2015 Vierke et al.
9,062,698 B2 6/2015 Baier et al.
9,181,762 B2 11/2015 Stoldt et al.
9,976,365 B2 5/2018 Vierke et al.
10,544,636 B1 1/2020 Vierke et al.
10,570,679 B2 2/2020 Stoldt et al.
10,648,254 B2 5/2020 Meuth
10,753,162 B2 * 8/2020 Vo ......................... E21B 19/161
10,767,425 B2 9/2020 Meuth et al.
10,801,275 B2 10/2020 Gruess et al.
10,808,468 B2 10/2020 Vo
10,808,469 B2 10/2020 Vo
10,808,470 B2 10/2020 Vo
10,927,616 B2 2/2021 Stoldt et al.
2002/0063435 A1 5/2002 Nelson
2007/0044975 A1 * 3/2007 Fraser ................. E21B 17/0853 166/367
2007/0261893 A1 * 11/2007 Campisi .................. E21B 19/10 166/77.51
2008/0277108 A1 * 11/2008 Bouligny, Jr. .......... E21B 19/07 166/77.52
2009/0056930 A1 * 3/2009 Angelle .................. E21B 19/24 166/77.51
2014/0360736 A1 * 12/2014 Angelle .................. E21B 19/10 166/381
2015/0152698 A1 * 6/2015 DeBerry ................. E21B 19/24 166/344
2015/0252633 A1 * 9/2015 Fulks ........................ E21B 3/04 166/78.1
2017/0044855 A1 * 2/2017 Sipos ...................... E21B 19/24
2018/0100359 A1 4/2018 Moss et al.
2018/0283112 A1 * 10/2018 Abou-Assaad ....... E21B 19/165

* cited by examiner

HYDRAULIC SPIDER TUBULAR CENTERING SYSTEMS AND METHODS FOR USE THEREOF

BACKGROUND

Field

Embodiments disclosed herein relate to a hydraulic spider tubular centering system for centering tubulars in a drilling or workover operation utilized in the oil and gas industry.

Description of the Related Art

A hydraulic spider is commonly used in the oil and gas industry to hold tubulars when making up or breaking out a threaded connection. The hydraulic spider sits in a drilling table and a drill string including tubulars is fed into the spider from above by an elevator. The hydraulic spider holds the drill string while a wrench tool rotates another tubular (held by the elevator) relative to the drill string to thread the tubulars together during a make-up operation and unthread the tubulars from one another during a break-out operation. The drill string can potentially damage the hydraulic spider if not centered when gripped by the hydraulic spider.

Therefore, there is a continuous need for new and/or improved hydraulic spider systems.

SUMMARY

Aspects of the present disclosure relate to a hydraulic spider tubular centering system and methods for use thereof.

In one embodiment, a tubular centralizer, including a housing, a guide plate, and a pin. The housing including a plurality of adjustment pin holes. The guide plate at least partially disposed within the housing and movable between a retracted position and an extended position, wherein the guide plate includes a plurality of adjustment pin slots. The pin positioned in a first adjustment pin hole of the plurality of adjustment pin holes and a first adjustment pin slot of the guide plate, wherein a length of the first adjustment pin slot within which the pin is positioned sets a limit of the extended position and the retracted position of the guide plate.

In one embodiment a method for centering a tubular including: positioning a pin of one or more centralizers of a tubular centering system in a first adjustment pin hole and a first adjustment pin slot of a guide plate of the one or more centralizers; positioning the tubular in a bore of a hydraulic spider; actuating the guide plate of the one or more centralizers into an extended position, wherein an axial position of the first adjustment pin hole and a length of the first adjustment pin slot sets a limit of the extended position, and wherein in the extended position, the guide plate engages with the tubular and centers the tubular in the bore of the hydraulic spider; gripping the tubular with slips of the hydraulic spider; and actuating the guide plate of the one or more centralizers into a retracted position, wherein the axial position of the first adjustment pin hole and the length of the first adjustment pin slot sets a limit of the retracted position, and wherein in the retracted position, the guide plate disengages the tubular.

In one embodiment, a tubular centering system, including a hydraulic spider and a plurality of centralizers coupled to the hydraulic spider. Each of the plurality of centralizers includes a housing, a guide plate, and a pin. The housing including a plurality of adjustment pin holes. The guide plate at least partially disposed within the housing and movable between a retracted position and an extended position, wherein the guide plate includes a plurality of adjustment pin holes. The pin positioned in a first adjustment pin hole of the plurality of adjustment pin holes and a first adjustment pin slot of the guide plate, wherein a length of the first adjustment pin slot within which the pin is positioned sets a limit of the extended position and the retracted position.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure contemplates that terms such as "couples," "coupling," "couple," and "coupled" may include but are not limited to welding, interference fitting, and/or fastening such as by using bolts, threaded connections, pins, clips, and/or screws. The disclosure contemplates that terms such as "couples," "coupling," "couple," and "coupled" may include but are not limited to integrally forming. The disclosure contemplates that terms such as "couples," "coupling," "couple," and "coupled" may include but are not limited to direct coupling and/or indirect coupling, such as indirect coupling through components such as links.

Figure 1A:
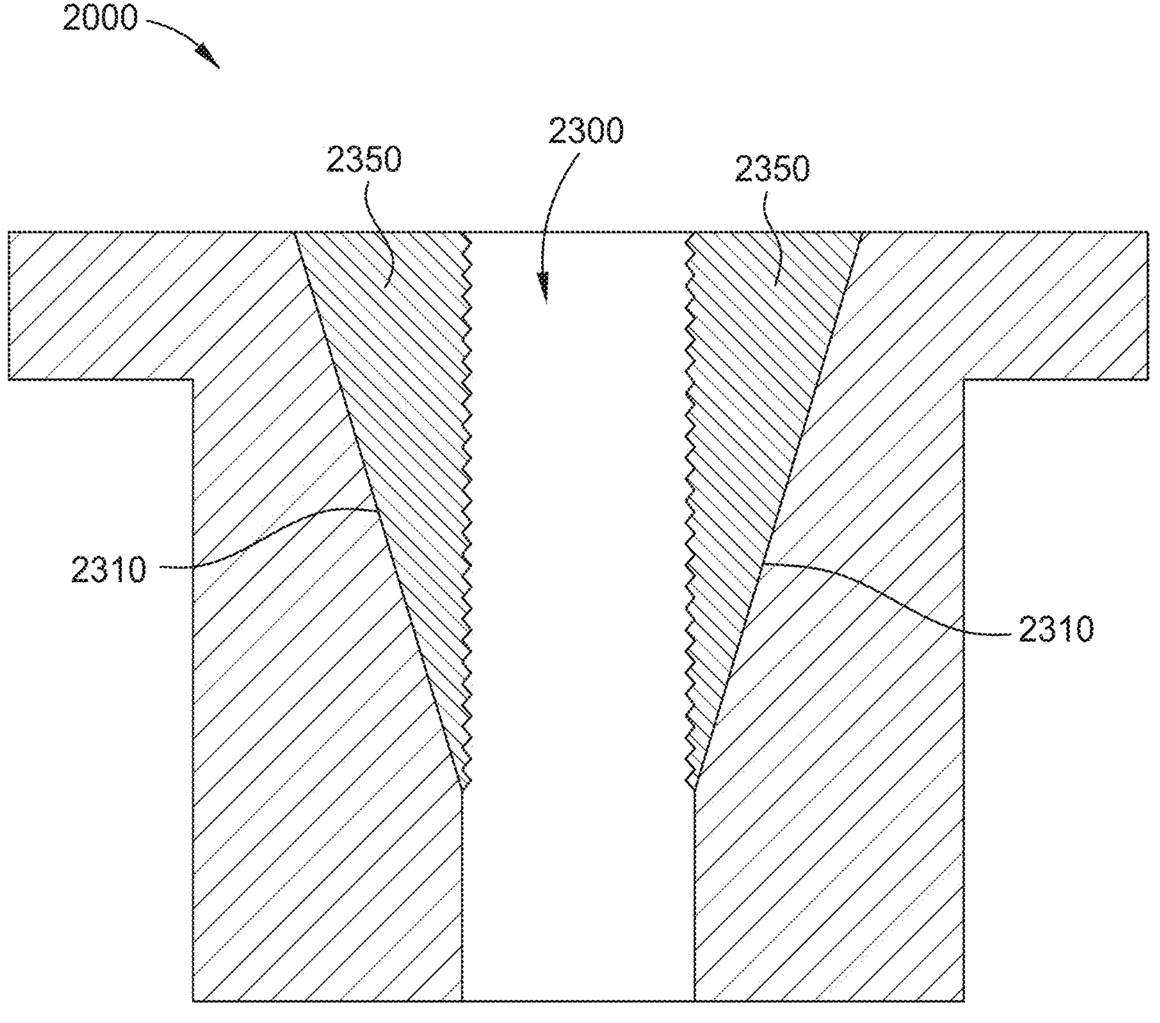
FIG. 1A is a schematic cross-sectional view of a hydraulic spider, according to one or more embodiments.
Figure 1B:
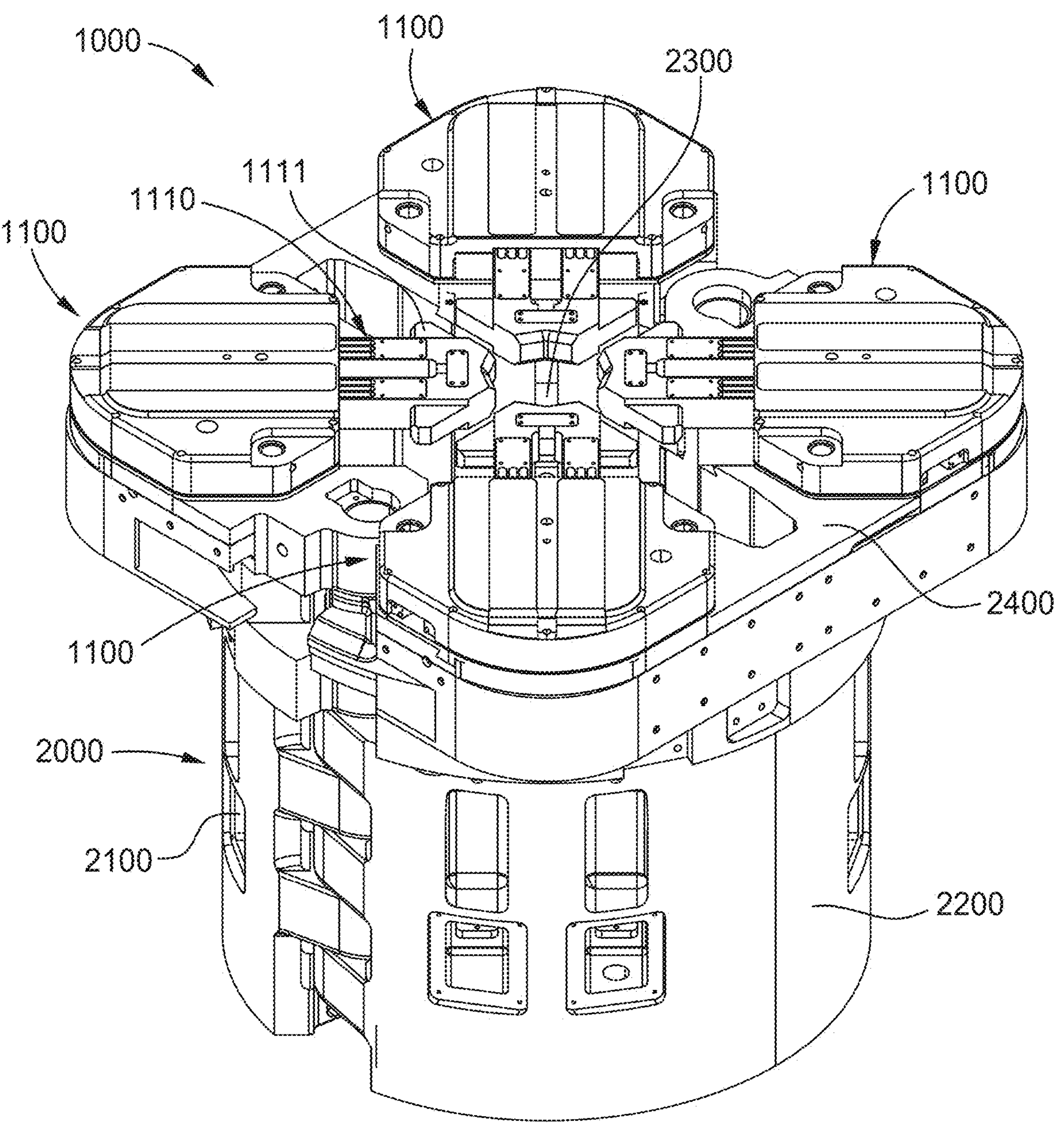
FIG. 1B is a top perspective view of the hydraulic spider of FIG. 1A with a hydraulic spider tubular centering system, according to one or more embodiments.

FIG. 1A is a cross-sectional view of a hydraulic spider 2000, schematically illustrating a pair of slips 2350. The hydraulic spider 2000 comprises a first body 2100 and a second body 2200 pivotally coupled to one another (as shown in FIG. 1B). The first body 2100 and the second body 2200 mate to one another in such a way to create a bore 2300 therethrough. The plurality of slips 2350 are disposed within the bore 2300. The slips 2350 are movable upward along a tapered portion 2310 of the bore 2300 into a disengaged position, and movable downward along the tapered portion 2310 into an engaged position. Although two slips 2350 are shown, the hydraulic spider 2000 may comprise three, four, five, six, or more slips 2350. A drill string comprising one or more tubulars can be moved (e.g. lowered or raised) through the bore 2300 of the hydraulic spider 2000 when the slips 2350 are in the disengaged position. The slips 2350 are moved into the engaged position to grip and hold the drill string when threading or unthreading another tubular to or from the drill string.

FIG. 1B is a top perspective view of the hydraulic spider 2000 with a tubular centering system 1000. The tubular centering system 1000 includes a plurality of tubular centralizers 1100 (referred to herein as centralizers 1100) disposed on and coupled to a top 2400 of the hydraulic spider 2000. The centralizers 1100 are configured to center a drill string within the bore 2300 before gripping the drill string with the slips 2350. Centering of the drill string allows the slips 2350 to evenly grip the circumference of the drill string, which might otherwise cause damage to the slips 2350 if misaligned. The centralizers 1100 may be removably coupled to the top 2400 of the hydraulic spider 2000, may be fixed to the top 2400 of the hydraulic spider 2000, or may be integral to the hydraulic spider 2000. The centralizers 1100 may be coupled to the top 2400 of the hydraulic spider 2000 by methods, including but not limited to, a bolted connection or a welded connection.

The centralizers 1100 are circumferentially spaced around the bore 2300 of the hydraulic spider 2000. In the illustrated embodiment, there are four centralizers 1100 disposed on the top 2400 of the hydraulic spider 2000. However, it is contemplated that there may be two, three, four, five, six, or more centralizers 1100 in the tubular centering system 1000.

Figure 2A:
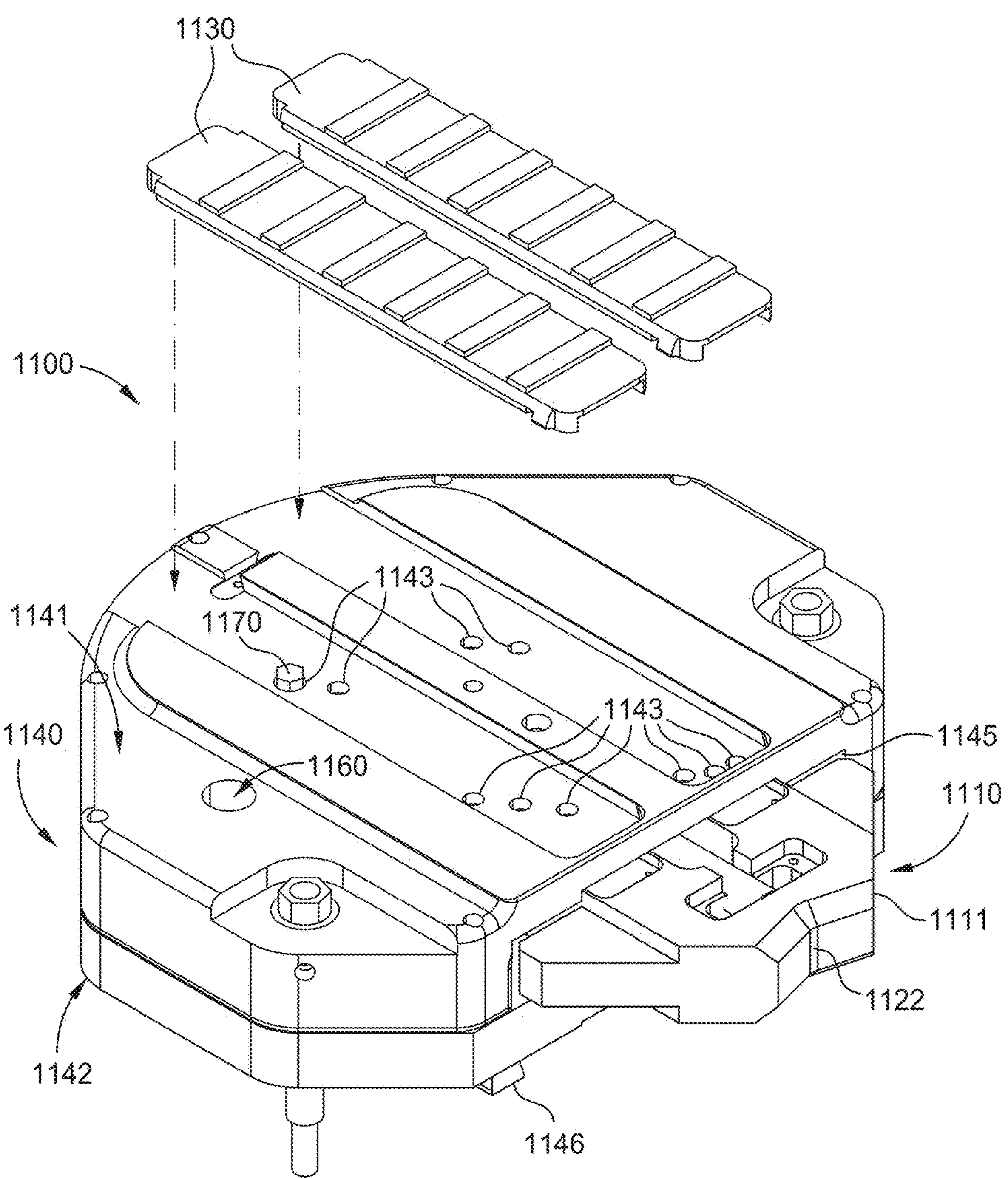
FIG. 2A is a top perspective view of a centralizer of the tubular centering system of FIG. 1B in a retracted position, according to one or more embodiments.
Figure 2B:
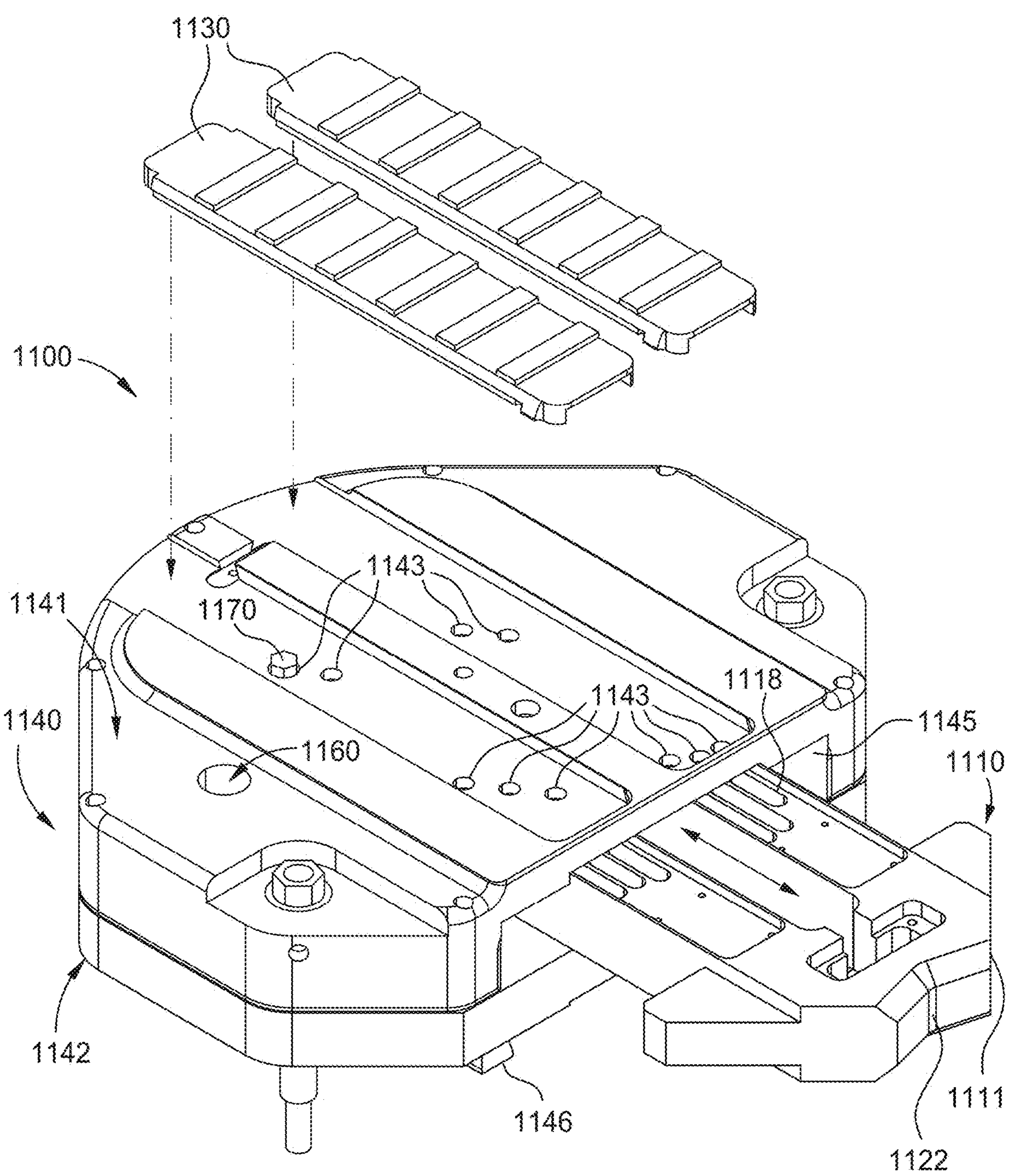
FIG. 2B is a top perspective view of the centralizer of FIG. 2A in an extended position, according to one or more embodiments.
Figure 2C:
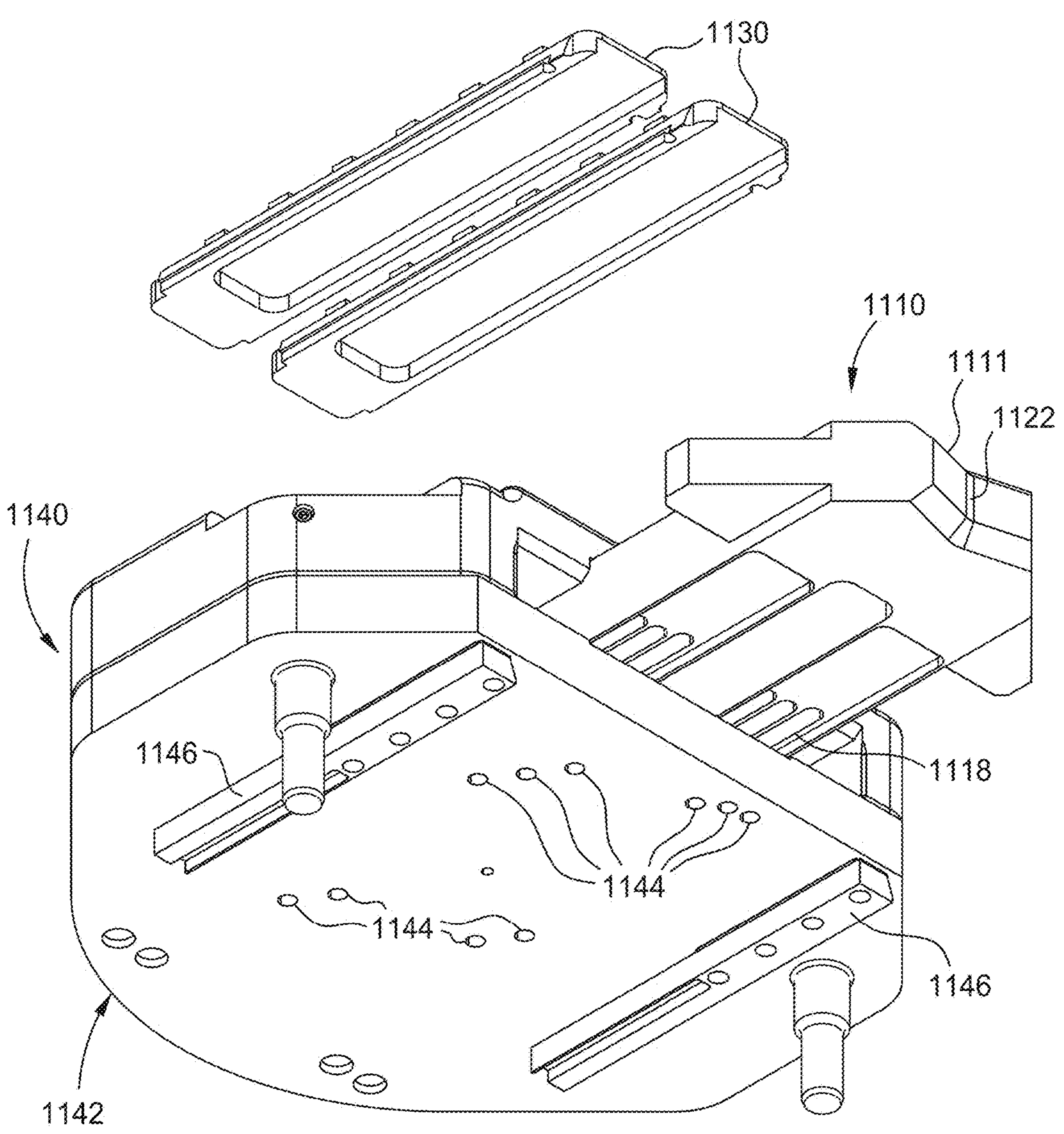
FIG. 2C is a bottom perspective view of the centralizer of FIGS. 2A-2B in an extended position, according to one or more embodiments.

Each of the centralizers 1100 include a guide plate 1110. Gripping ends 1111 of the guide plates 1110 are movable between a retracted position (as shown in FIG. 2A) and an extended position (as shown in FIGS. 2B-2C). In the extended position, the gripping ends 1111 of the guide plates 1110 form a smaller bore above and aligned with the center of the bore 2300 of the hydraulic spider 2000 to center a tubular of a drill string in the bore 2300 of the hydraulic spider 2000. The diameter of the smaller bore formed by the gripping ends 1111 of the guide plates 1110 is dependent on the diameter of the tubular to be centered. The distance that the guide plates 1110 extend or retract can be controlled to form a desired size of the smaller bore. The tubular centering system 1000 can therefore be configured to center tubulars of different diameters.

In some embodiments, hydraulic fluid supplied to the hydraulic spider 2000 is also routed to the centralizers 1100 to operate the centralizers 1100. In such embodiments, the hydraulic fluid may be supplied via a control unit and be distributed to the centralizers 1100 via one or more distributor blocks. Thus, the hydraulic fluid is supplied via the control unit to the distributor blocks and then routed to the centralizers 1100 to extend and retract the guide plates 1110.

FIGS. 2A-2B are a top perspective views of one of the centralizers 1100. FIG. 2A is a top perspective view of the centralizer 1100 with the guide plate 1110 in the retracted position. FIG. 2B is a top perspective view of the centralizer 1100 with the guide plate 1110 in the extended position. The centralizer 1100 includes the guide plate 1110, one or more top covers 1130, a housing 1140 with a top surface 1141 and a bottom surface 1142, a hydraulic adjustment 1160, and a pin 1170.

The one or more top covers 1130 are disposed on and coupled to the top surface 1141 of the housing 1140. The top covers 1130 cover various top adjustment pin holes 1143 disposed through the top surface 1141 of the housing 1140. The top covers 1130 prevent objects, such as dust, dirt, and grime, from entering the centralizer 1100 through the top adjustment pin holes 1143. The one or more top covers 1130 may be coupled to the top surface 1141 of the housing 1140 by one or more fasteners, such as screws, and/or may be inserted into slots formed above the pin holes 1143. The top covers 1130 have a recessed portion on the underside so that when the pin 1170 is positioned into one of the top adjustment pin holes 1143, the head of the pin 1170 does not obstruct installation of the top covers 1130.

In one or more embodiments, the housing 1140 includes two parts, a top housing and a bottom housing that are coupled to one another by the same coupling that couples the centralizer 1100 to a hydraulic spider (such as the hydraulic spider 2000 of FIG. 1). In one or more embodiments, the top housing and the bottom housing are coupled to one another by separate fasteners disposed through holes in the top housing and the bottom housing The housing 1140 includes an opening 1145 at one end. The guide plate 1110 is disposed within the opening 1145 and extends from and retracts into the opening 1145.

The top surface 1141 of the housing 1140 includes the plurality of top adjustment pin holes 1143. The pin 1170 can be manually moved between the plurality of top adjustment pin holes 1143 at various axial positions in the top surface 1141 of the housing 1140 to selectively control the stroke of the guide plate 1110. Each top adjustment pin hole 1143 adjusts the stroke of the guide plate 1110 by positioning the pin 1170 in a corresponding adjustment pin slot 1118 of the guide plate 1110, which thereby adjusts (e.g. limits) the amount of stroke.

The top adjustment pin hole 1143 and corresponding adjustment pin slot 1118 similarly adjust (e.g. limit) the amount the guide plate 1110 can retract into the centralizer 1100 (e.g. the maximum amount the guide plate 1110 may retract into the housing 1140) and adjusts (e.g. limits) the amount the guide plate 1110 can extend from the centralizer 1100 (e.g. the maximum amount the guide plate 1110 may extend from the housing 1140). The pin 1170 acts as a stop against the opposite ends of the adjustment pin slot 1118 in which the pin 1170 is located via the corresponding top adjustment pin hole 1143. The top adjustment pin holes 1143 are located at different positions relative to each other depending on the desired diameter of tubular to be centered.

The top adjustment pin holes 1143 also correspond to different adjustment pin slots 1118, which have different lengths and/or spacing relative to the other adjustment pin slots 1118. The top adjustment pin holes 1143 and the corresponding adjustment pin slots 1118 correspond to diameters of tubulars that the tubular centering system 1000 is centering. Each top adjustment pin hole 1143 and the corresponding adjustment pin slot 1118 corresponds to a range of diameters of tubulars and when the pin 1170 is disposed in a particular top adjustment pin hole 1143 and the corresponding adjustment pin slot 1118, the centralizer 1100 is configured to centralize tubulars that have diameters falling within that range of diameters.

Each top adjustment pin hole 1143 has a corresponding adjustment pin slot 1118 in the guide plate 1110. The top adjustment pin holes 1143 may be located at different positions, both axial and horizontal, within the housing 1140. When the pin 1170 is disposed in one of the top adjustment pin holes 1143, the stroke of the guide plate 1110 is limited to the length of its corresponding adjustment pin slot 1118 due to the pin 1170 acting as a physical stop in the adjustment pin slot 1118. The axial position of the top adjustment pin hole 1143 limits the maximum extended position of the guide plate 1110 and the maximum retracted position of the guide plate 1110.

By way of example, a first adjustment pin slot 1118 with a length of 3" and a second adjustment pin slot 1118 with a length of 3" will both result in a guide plate 1110 stroke of 3" because the pin 1170 physically limits the guide plate 1110 stroke. However, if the first adjustment pin hole 1143 corresponding to the first adjustment pin slot 1118 is located 6" forward (in an axial direction) from the second adjustment pin hole 1143 corresponding to the second adjustment pin slot 1118, the extended and retracted positions of the guide plate 1110 will be 6" further forward (in an axial direction) than that of the second adjustment pin hole 1143 and second adjustment pin slot 1118 when the pin 1170 is disposed in the first adjustment pin hole 1143 and the first adjustment pin slot 1118. The further forward extended and retracted positions would correspond to a smaller diameter tubular because the guide plate 1110 is extendable further toward the center of the bore 2300 of a hydraulic spider (such as hydraulic spider 2000 of FIGS. 1A-1B).

The top surface 1141 of the housing 1140 further includes an access hole to the hydraulic adjustment 1160. A tool can be inserted through the access hole to engage the hydraulic adjustment 1160 which is within the housing 1140. By engaging and moving (e.g. rotating) the hydraulic adjustment 1160 with the tool, the fluid communication between a hydraulic supply and a piston assembly (such as piston assembly 1121 illustrated in FIGS. 4-5) operating the guide plate 1110 can be controlled.

FIG. 2C is a bottom perspective view of the centralizer 1100 of FIGS. 2A-2B in the extended position. The bottom surface 1142 of the housing 1140 includes a plurality of bottom adjustment pin holes 1144 and one or more assembly rails 1146.

The plurality of bottom adjustment pin holes 1144, disposed through the bottom surface 1142 of the housing 1140 at various axial positions in the bottom surface 1142 of the housing 1140, correspond to the plurality of top adjustment pin holes 1143 through the top surface 1141 of the housing 1140. Thus, when the pin 1170 is disposed through a top adjustment pin hole 1143 in the top surface 1141 of the housing 1140, it passes through the guide plate 1110 and into the corresponding bottom adjustment pin hole 1144 in the bottom surface 1142 of the housing 1140. The bottom adjustment pin holes 1144 may be configured to secure the pin 1170 in place. In one or more embodiments, the pin 1170 has a threaded portion and the bottom adjustment pin holes 1144 are threaded to secure the pin 1170 in place.

The one or more assembly rails 1146 are disposed on and coupled to the bottom surface 1142 of the housing 1140. The one or more assembly rails 1146 may be used to couple the centralizer 1100 to a hydraulic spider (such as hydraulic spider 2000 of FIG. 1). The one or more assembly rails 1146 may also position and align the centralizer 1100 on the hydraulic spider so that the extension and retraction of the guide plate 1110 centers a tubular in the center of a bore (such as bore 2300 of FIG. 1) of the hydraulic spider.

Figure 3A:
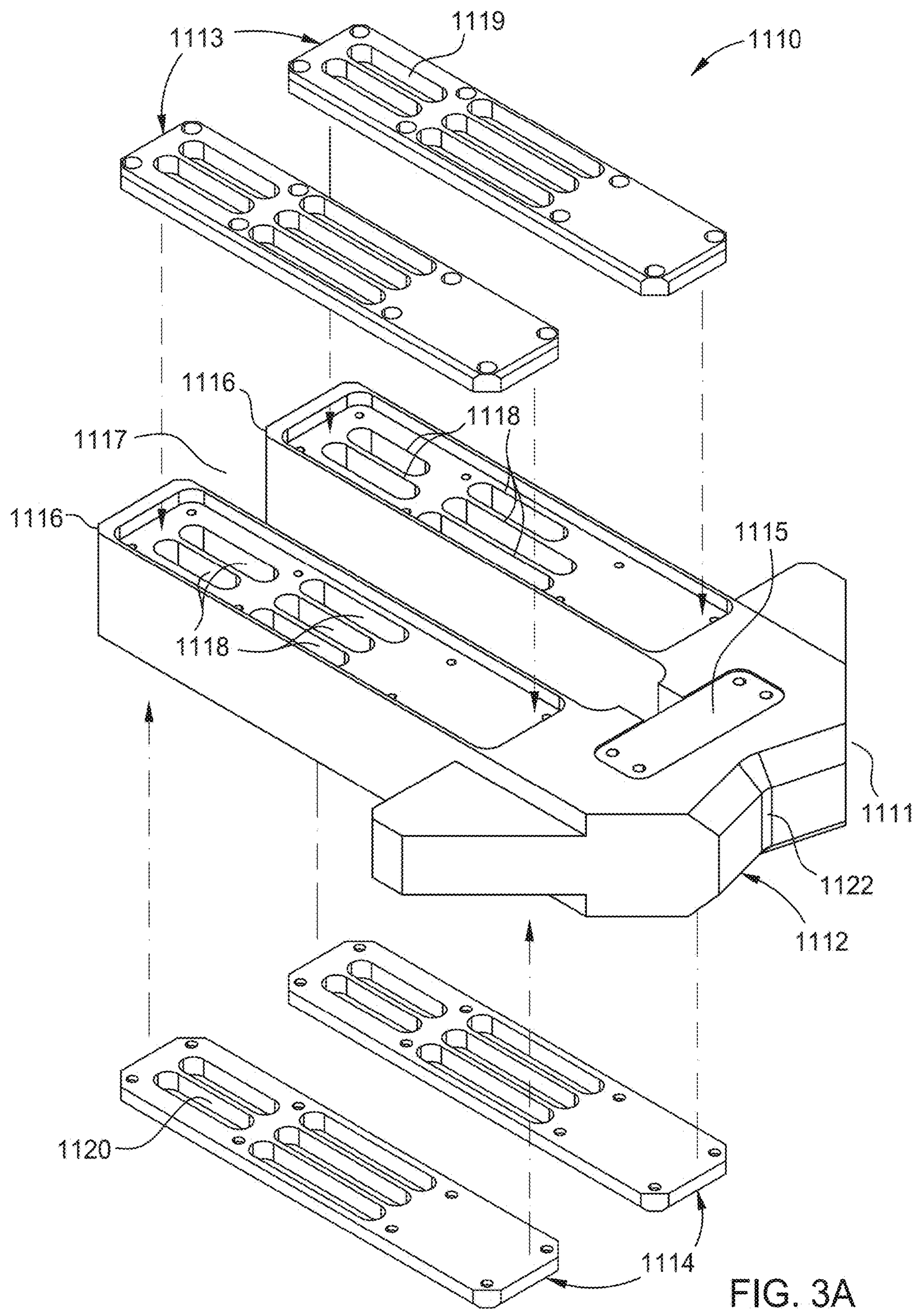
FIG. 3A is a top perspective exploded view of a guide plate of the centralizer of FIGS. 2A-2C, according to one or more embodiments.
Figure 3B:
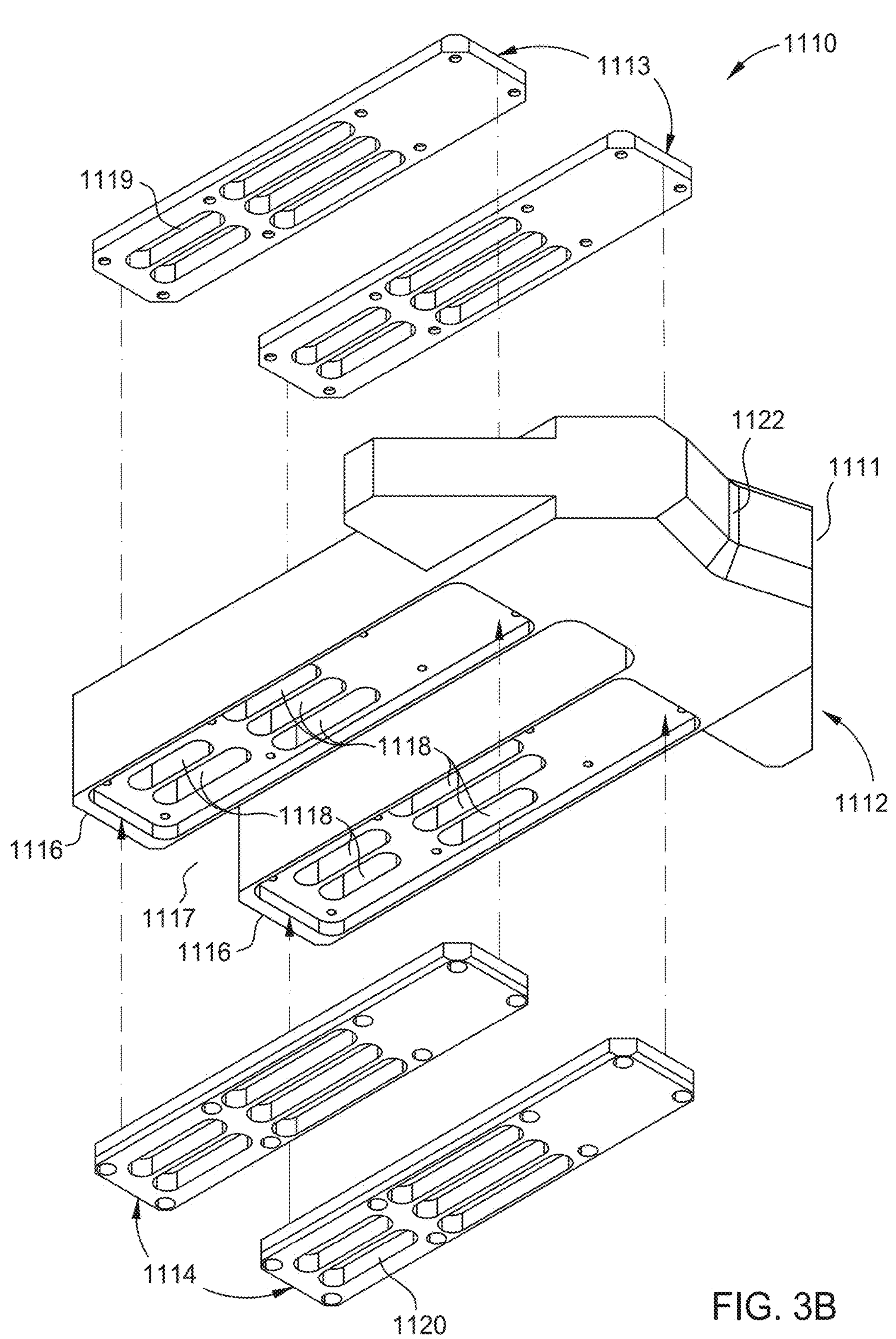
FIG. 3B is a bottom perspective exploded view of the guide plate of FIG. 3A, according to one or more embodiments.

FIGS. 3A-3B are exploded views of the guide plate 1110 of FIGS. 1B-2C. FIG. 3A is a top perspective exploded view of the guide plate 1110. FIG. 3B is a bottom perspective exploded view of the guide plate 1110.

The guide plate 1110 includes a body 1112, one or more top friction plates 1113, one or more bottom friction plates 1114, and a piston pad 1115. The body 1112 includes the gripping end 1111. The body 1112 also includes two protrusions 1116 extending from the gripping end 1111. The gripping end 1111 is triangular with a recess 1122 at its tip. The recess 1122 is shaped to be complementary to a portion of the tubular that the gripping end 1111 engages with. The arc length and shape of the recess 1122 is dependent on the number of centralizers (such as the plurality of centralizers 1100 of FIGS. 1B-2C) used in a particular tubular centering (such as tubular centering system 1000 of FIG. 2A). During a centering operation, the gripping end 1111 of each centralizer of the tubular centering system exerts a gripping force on a portion of the tubular to enclose the tubular with the other gripping ends of the other centralizers in the system, thereby centering the tubular.

The piston pad 1115 is inserted into and coupled to an end of the gripping end 1111 opposite the recess 1122. In one or more embodiments, the piston pad 1115 is coupled to the gripping end 1111 by fasteners. In one or more embodiments, the piston pad 1115 is integral to the gripping end 1111. The piston pad 1115 is configured to support and transfer forces exerted onto the gripping end 1111 by a piston assembly (such as piston assembly 1121 of FIGS. 4-5) used to extend and retract the guide plate 1110. When the guide plate 1110 is extended to the extended position, the piston assembly exerts an axial force onto the piston pad 1115 to push the gripping end 1111 of guide plate 1110 from the centralizer. When the guide plate 1110 retracted from the extended position to the retracted position, the piston assembly exerts an axial force onto the piston pad 1115 to pull the gripping end 1111 of the guide plate into the centralizer.

The protrusions 1116 extend from the gripping end 1111 and are spaced apart by a gap 1117. The gap 1117 allows for positioning of the piston assembly to exert forces on the piston pad 1115 unobstructed. The protrusions 1116 include the adjustment pin slots 1118. The adjustment pin slots 1118 vary in length and position along the protrusions 1116. The adjustment pin slots 1118 include lengths within a range of 1 inch to 23.5 inches. In one embodiment, a length of a first adjustment pin slot 1118 is about 3.5 inches, and a length of a second adjustment pin slot 1118 is about 2 inches.

The adjustment pin slots 1118 correspond to respective top adjustment pin holes (such as top adjustment pin holes 1143 of FIGS. 2A-2B) of a centralizer housing (such as housing 1140 of FIGS. 1B-2C) and bottom adjustment pin holes (such as bottom adjustment pin holes 1144 of FIG. 2C) of the centralizer housing. When a pin (such as pin 1170 of FIGS. 2A-2C) is positioned through a top adjustment pin hole, one of the adjustment pin slots 1118, and a bottom adjustment pin hole, the stroke of the guide plate 1110 is physically limited. The adjustment pin slots 1118 also set the retracted position (e.g. minimum extended position) and the extended position (e.g. maximum extended position) of the guide plate 1110 due to the dimensions of the adjustment pin slots 1118 and the position of the adjustment pin slots 1118 on the guide plate 1110 with respect to the corresponding centralizer. Therefore, configuring a stroke, extended position, and retracted position includes inserting the pin into a desired top adjustment pin hole, through an adjustment pin slot 1118, and through a bottom adjustment pin hole. Therefore, each centralizer of the tubular centering system can be configured to have a desired stroke, desired extended position, and desired retracted position based on the diameter of the tubular to be centered.

The one or more top friction plates 1113 are disposed on and coupled to the top of the protrusions 1116. In one or more embodiments, the one or more top friction plates 1113 are recessed into the tops of protrusions 1116 so that there is sufficient clearance between the one or more top friction plates 1113 and the opening (such as opening 1145 of FIGS. 2A-2C) of the centralizer housing that the guide plate 1110 extends from and retracts into.

The one or more top friction plates 1113 are configured to reduce friction between the body 1112 of the guide plate 1110 and the centralizer housing. The one or more top friction plates 1113 are configured to prevent the guide plate 1110 from binding, grinding, sticking, or otherwise being impaired from extending from or retracting into the centralizer housing. The one or more top friction plates 1113 further include top friction plate pin slots 1119. The top friction plate pin slots 1119 allow for a pin to pass through the one or more top friction plates 1113 while configuring the stroke, retracted position, and extended position of the centralizer. In one or more embodiments, the top friction plate pin slots 1119 may be dimensioned similarly to the adjustment pin slots 1118. In one or more embodiments, the top friction plate pin slots 1119 are larger than the adjustment pin slots 1118 so that they are swappable between protrusions 1116 and so that the adjustment pin slots 1118 dictate the stroke, retracted position, and extended position of the guide plate 1110 rather than the one or more top friction plates 1113 dictating the stroke retracted position, and extended position of the guide plate 1110.

The one or more bottom friction plates 1114 are disposed on and coupled to the bottom of protrusions 1116. In one or more embodiments, the one or more bottom friction plates 1114 are recessed into the bottoms of protrusions 1116 so that there is appropriate clearance between the one or more bottom friction plates 1114 and the opening of the centralizer housing the guide plate 1110 extends from and retracts into.

The one or more bottom friction plates 1114 are configured to reduce friction between the body 1112 of the guide plate 1110 and the centralizer housing. The one or more bottom friction plates 1114 prevent the guide plate 1110 from binding, grinding, sticking, or otherwise being impaired from extending from or retracting into the centralizer housing. The one or more bottom friction plates 1114 include bottom friction plate pin slots 1120. The bottom friction plate pin slots 1120 allow for a pin (such as the pin 1170) to pass through the adjustment pin slots 1118 and into the bottom adjustment pin holes 1144 while configuring the stroke, retracted position, and extended position of the centralizer.

In one or more embodiments, the bottom friction plate pin slots 1120 may be dimensioned similarly to the adjustment pin slots 1118. In one or more embodiments, the bottom friction plate pin slots 1120 are larger than the adjustment pin slots 1118 so that they are swappable between protrusions 1116 and so that the adjustment pin slots 1118 dictate the stroke, retracted position, and extended position of the guide plate 1110 rather than the one or more bottom friction plates 1114 dictating the stroke retracted position, and extended position of the guide plate 1110.

Figure 4:
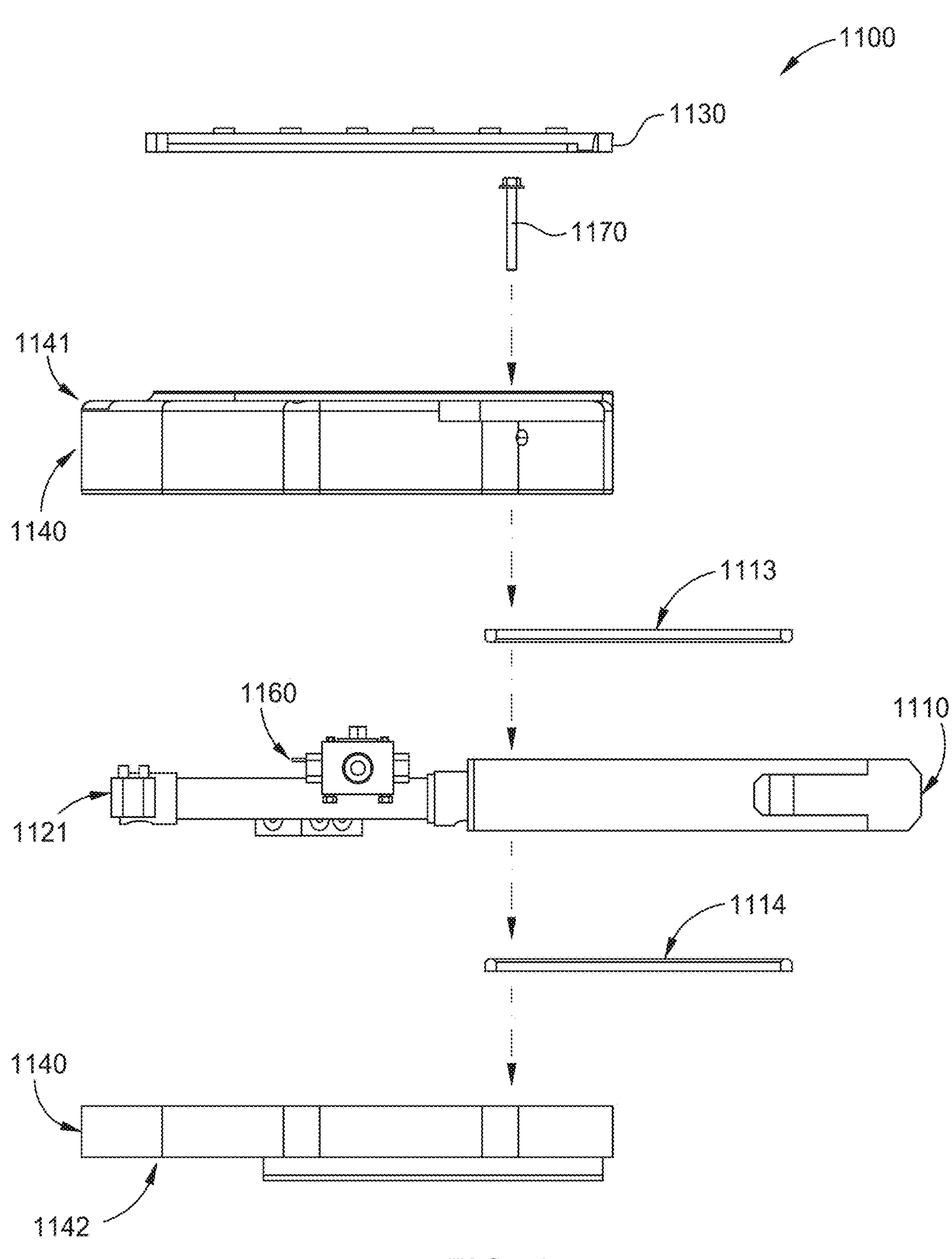
FIG. 4 is a side exploded view of the centralizer of FIGS. 2A-2C, according to one or more embodiments.

FIG. 4 is a side exploded view of the centralizer 1100 of FIGS. 2A-2C. Configuring each centralizer 1100 to center a tubular requires setting the pin 1170 in a particular top adjustment pin hole 1143. Each top adjustment pin hole 1143 is used for a range of diameters of tubulars and sets a stroke, extended position, and retracted position of the guide plate 1110 so that the tubulars within that range of diameters are effectively centered. Setting the centralizer 1100 for a particular tubular includes removing the one or more top covers 1130 from the housing 1140, removing the pin 1170 from a standby position and positioning the pin 1170 through the desired top adjustment pin hole 1143, through a corresponding top friction plate pin slot 1119, through a corresponding adjustment pin slot 1118, through a corresponding bottom friction plate pin slot 1120, and through a corresponding bottom adjustment pin hole 1144.

Figure 5:
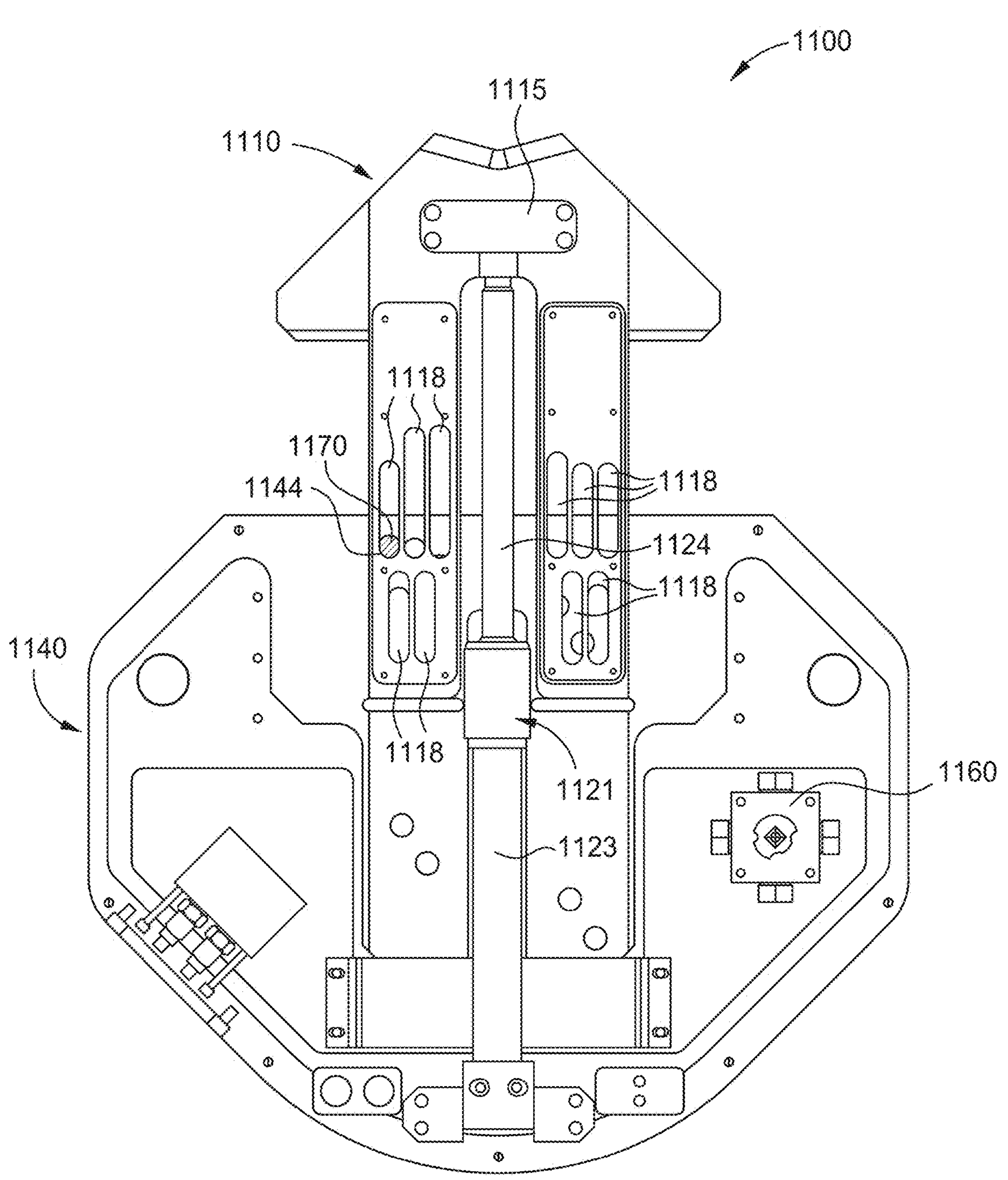
FIG. 5 is a top view of the centralizer of FIGS. 2A-2C with the top of the housing removed, according to one or more embodiments.

FIG. 5 is a top view of the centralizer 1100 with the top of the housing 1140 and the top friction plate 1113 removed. FIG. 5 shows the centralizer 1100 with the pin 1170 in an exemplary position. That is, the pin 1170 is positioned through an adjustment pin slot 1118 and a bottom adjustment pin hole 1144. As illustrated, the guide plate 1110 is in the fully extended position corresponding to the top adjustment pin hole, the bottom adjustment pin hole 1144, and the adjustment pin slot 1118 within which the pin 1170 is disposed within.

The guide plate 1110 is moved between the extended position, as illustrated in FIG. 5, and the retracted position by the piston assembly 1121. The piston assembly 1121 comprises a hydraulic cylinder 1123 and a piston rod 1124 extendable from and retractable into the hydraulic cylinder 1123. The hydraulic cylinder 1123 may be supplied with hydraulic fluid from a hydraulic supply to extend the piston rod 1124 and exert a force on the piston pad 1115 to extend the guide plate 1110 from the housing 1140, and/or to retract the piston rod 1124 and pull on the piston pad 1115 to retract the guide plate 1110 into the housing 1140.

The hydraulic adjustment 1160 is disposed within the housing 1140. In one or more embodiments, the hydraulic adjustment 1160 is a four way ball valve having multiple passages through which hydraulic fluid can flow and be directed as needed, such as into and/or out of the piston assembly 1121 via one or more fluid lines. The hydraulic adjustment 1160 is used to route hydraulic fluid within the centralizer 1100 and is used to adjust and position the guide plate 1110 with a high degree of sensitivity (e.g. precision). The hydraulic adjustment 1160 receives hydraulic fluid from a hydraulic supply and then routes the hydraulic fluid to or from the piston assembly 1121.

The hydraulic adjustment 1160 may also be used to change the configuration of each centralizer 1100. When changing the configuration of each centralizer 1100, a pin (such as pin 1170 of FIGS. 2A-2B and FIG. 4) is removed from its current configuration and the hydraulic adjustment 1160 is engaged and manipulated to move the guide plate 1110 to a different position to align particular adjustment pin holes (such as top adjustment pin holes 1143 of FIGS. 2A-2C and bottom adjustment pin holes 1144) and adjustment pin slots (such as adjustment pin slots 1118, top friction plate pin slots 1119, and bottom friction plate pin slots 1120 of FIGS. 3A-3B) so that the pin can be positioned through the aligned adjustment pin holes and slots.

A tool is engagable with the hydraulic adjustment 1160. The tool moves the hydraulic adjustment 1160 to selectively open and close the hydraulic adjustment 1160 and/or selectively route hydraulic fluid to or from the piston assembly 1121. Thus, the hydraulic adjustment 1160 may close fluid communication between the hydraulic supply and the piston assembly 1121, route hydraulic fluid to the piston assembly 1121 to extend the piston assembly 1121, or route hydraulic fluid from the piston assembly 1121 to retract the piston assembly 1121. By controlling fluid communication between the hydraulic supply and the piston assembly 1121, the hydraulic adjustment is configured to control extension and retraction of the guide plate 1110 with a high level of sensitivity (e.g. precision). Therefore, in operation, the hydraulic adjustment 1160 may be used to manually adjust the position of the guide plate 1110 to align pin slots and holes to change the configuration of the centralizer 1100.

Figure 6:
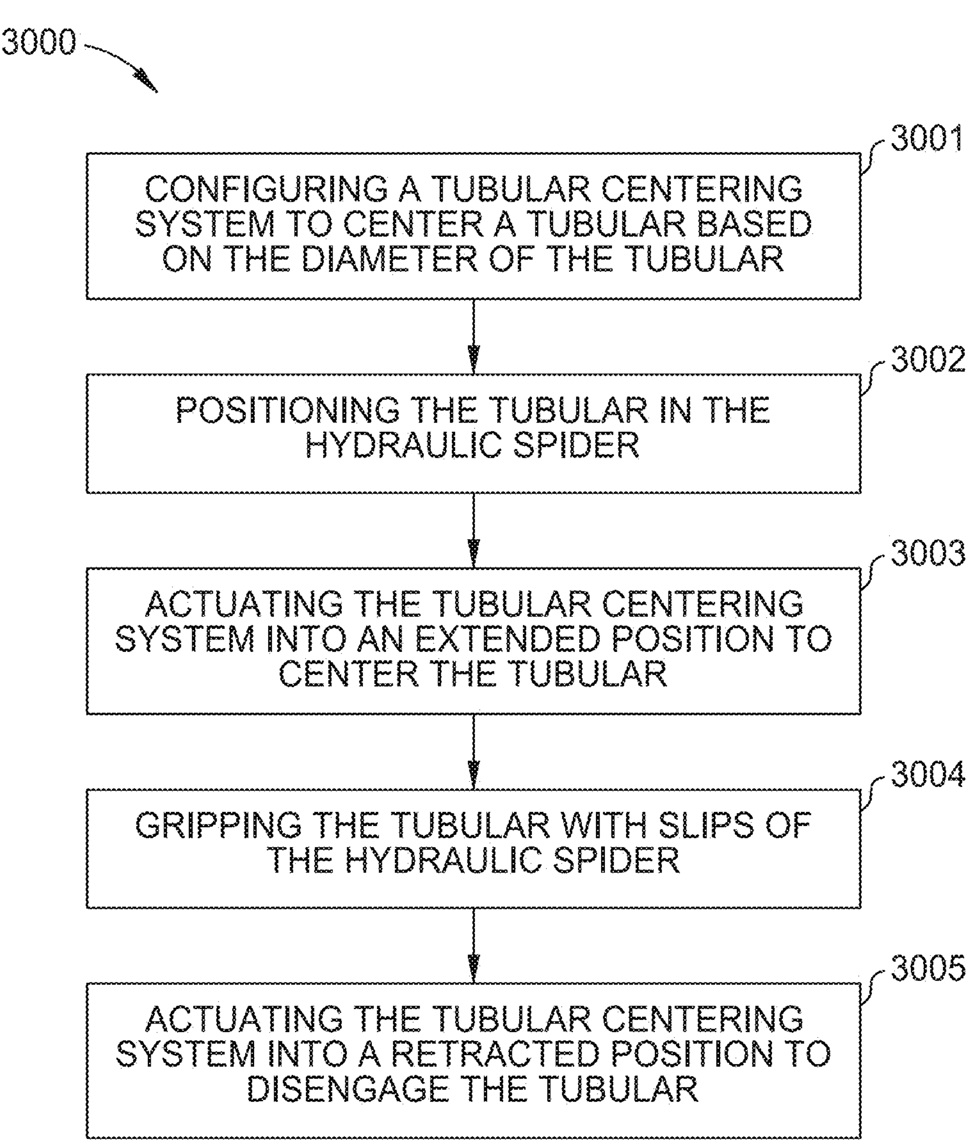
FIG. 6 illustrates a method for centering a tubular in a hydraulic spider, according to one or more embodiments.

FIG. 6 illustrates a method 3000 for centralizing a tubular in a hydraulic spider (such as hydraulic spider 2000 of FIGS. 1A-1B).

In step 3001, a tubular centering system (such as tubular centering system 1000 of FIG. 1B) is set up (e.g. configured) to center the tubular in the hydraulic spider based on the outer diameter size of the tubular that is being centered. That is, the diameter of the tubular to be centered determines the stroke, maximum extended position, and maximum retracted position of a guide plate (such as guide plate 1110 of FIGS. 1B-5) of each centralizer (such as centralizers 1100 of FIGS. 1B-2C) of the tubular centering system.

Setting each centralizer of the system includes removing one or more top covers (such as top covers 1130 of FIGS. 2A-2C and FIG. 4), removing a pin (such as pin 1170 of FIGS. 2A-2B and FIG. 4) from a standby position or a previous position and positioning the pin in one of a plurality of adjustment pin holes and slots. Positioning the pin in one of the plurality of adjustment pin holes and slots includes positioning the pin through a desired top adjustment pin hole (such as top adjustment pin holes 1143 of FIGS. 2A-2B) of a housing (such as housing 1140 of FIGS. 2A-2C and FIGS. 4-5), through a corresponding top friction plate pin slot (such as top friction plate pin slots 1119 of FIGS. 3A-4), through a corresponding adjustment pin slot (such as adjustment pin slots 1118 of FIGS. 3A-3B and FIG. 5) of the guide plate, through a corresponding bottom friction plate pin slot (such as bottom friction plate pin slots 1120 of FIGS. 3A-3B), and through a corresponding bottom adjustment pin hole (such as bottom adjustment pin hole 1144 of FIG. 2C and FIG. 5) of the housing.

Each adjustment pin hole and slot are used for a different range of diameters of tubulars to be centered. When the pin is positioned in one of the aligned adjustment pin holes and slots, the pin physically limits the stroke, the maximum extended length (e.g. the extended position), and the minimum extended length (e.g. the retracted position) of the guide plate with respect to the centralizer based on the length of the adjustment pin slot. Thus, when the pin is disposed in a particular aligned adjustment pin hole and slot, the guide plate is only allowed to extend a certain distance from the centralizer toward the tubular and retract a certain distance into the centralizer.

Setting up the tubular centering system may also require altering a previous position of the pin. When altering the previous position, a hydraulic adjustment (such as hydraulic adjustment 1160 of FIGS. 2A-B and FIGS. 4-5) is engaged with and manipulated by a tool to selectively permit or prevent fluid communication between a hydraulic supply and a piston assembly (such as piston assembly 1121 of FIGS. 4-5) configured to extend and retract the guide plate. Selectively permitting and preventing fluid communication (e.g. controlling the supply of hydraulic fluid to and/or from the hydraulic cylinder of the piston assembly) adjusts the position of the guide plate with a high level of sensitivity (e.g. precision). After removing the pin from the previous position, the hydraulic adjustment is manipulated to manually move the guide plate to another position to align a different set of adjustment pin holes and slots. When the guide plate is in the desired position where a new set of adjustment pin holes and slots are aligned, the pin is then positioned in the new set of aligned adjustment pin holes and slots configuring the centralizer to have a different stroke, maximum extended length, and minimum extended length for use with a different diameter of tubular.

In step 3002, the tubular to be centered is positioned in a bore (such as bore 2300 of FIG. 1) of the hydraulic spider between a first body (such as first body 2100 of FIG. 1) of the hydraulic spider and a second body (such as second body 2200 of FIG. 1) of the hydraulic spider.

In step 3003, the tubular centering system is hydraulically actuated to extend the respective guide plates to an extended position. In one or more embodiments, the piston assemblies of the centralizers of the tubular centering system are hydraulically actuated to cause the piston rods to extend the respective guide plates to the extended position to center the tubular in the bore of the hydraulic spider. Hydraulic fluid is uniformly supplied to the piston assembly of each centralizer so that all of the centralizers of the system extend at the same speed to engage the tubular at the same time to center the tubular.

In step 3004, slips (such as slips 2350 of FIG. 1) of the hydraulic spider are actuated to engage (e.g. grip) the centered tubular. The slips of the hydraulic spider slide along a tapered surface (such as tapered portion 2310 of FIG. 1) of the hydraulic spider to extend into the bore of the hydraulic spider to engage with the centered tubular and hold the tubular in place to thread or unthread another tubular onto the centered tubular.

In step 3005, the tubular centering system is hydraulically actuated to retract the respective guide plates to a retracted position. In one or more embodiments, the piston assemblies of the centralizers of the tubular centering system are hydraulically actuated to cause the piston rods to retract the respective guide plates to the retracted position to disengage the tubular. The steps of the method 3000 may be repeated for centralizing subsequent tubulars.

While the foregoing is directed to embodiments of the present disclosure, other and further embodiments of the disclosure may be devised without departing from the basic scope thereof, and the scope thereof is determined by the claims that follow.

Any one or more components of the tubular centering system 1000 and the hydraulic spider 2000 may be integrally formed together, directly coupled together, and/or indirectly coupled together and are not limited to the specific arrangement of components illustrated in FIGS. 1-5. Any one or more of the embodiments of the tubular centering system 1000 and hydraulic spider 2000 may be combined in whole or part with any one or more of the embodiments of the tubular centering system 1000 and hydraulic spider 2000.

It will be appreciated by those skilled in the art that the preceding embodiments are exemplary and not limiting. It is intended that all modifications, permutations, enhancements, equivalents, and improvements thereto that are apparent to those skilled in the art upon a reading of the specification and a study of the drawings are included within the scope of the disclosure. It is therefore intended that the following appended claims may include all such modifications, permutations, enhancements, equivalents, and improvements. The disclosure also contemplates that one or more aspects of the embodiments described herein may be substituted in for one or more of the other aspects described. The scope of the disclosure is determined by the claims that follow.

We claim:

1. A tubular centralizer, comprising:

a housing comprising a plurality of adjustment pin holes disposed through a top surface of the housing, and a plurality of bottom adjustment pin holes disposed through a bottom surface of the housing;

a guide plate at least partially disposed within the housing and movable between a retracted position and an extended position, wherein the guide plate comprises a plurality of adjustment pin slots; and a pin positioned in a first adjustment pin hole of the plurality of adjustment pin holes and a first adjustment pin slot of the guide plate, wherein a length of the first adjustment pin slot within which the pin is positioned sets a limit of the extended position and the retracted position of the guide plate.

2. The tubular centralizer of claim 1, wherein the pin is positionable in a second adjustment pin hole and a second adjustment pin slot, wherein a length of the second adjustment pin slot within which the pin is positioned sets a limit of a second extended position and a second retracted position of the guide plate.

3. The tubular centralizer of claim 2, wherein:

the first adjustment pin hole is at a first axial position in the housing and the first axial position also sets the limit of the extended position and the retracted position; and the second adjustment pin hole is at a second axial position in the housing and the second axial position also sets the limit of the second extended position and the second retracted position.

4. The tubular centralizer of claim 2, wherein:

the length of the first adjustment pin slot is about 3.5 inches; and the length of the second adjustment pin slot is about 2 inches.

5. The tubular centralizer of claim 2, wherein:

the pin positioned in the first adjustment pin hole and the first adjustment pin slot is configured to center a tubular with a first diameter; and the pin positioned in the second adjustment pin hole and the second adjustment pin slot is configured to center a tubular with a second diameter.

6. The tubular centralizer of claim 1, further comprising a friction plate disposed on the guide plate, wherein the friction plate comprises a plurality of friction plate slots disposed therethrough.

7. The tubular centralizer of claim 6, wherein the pin is disposed through a first friction plate slot of the plurality of friction plate slots.

8. The tubular centralizer of claim 1, wherein the pin is positioned in a first of the plurality of bottom adjustment pin holes.

9. The tubular centralizer of claim 1, further comprising a piston assembly, wherein the piston assembly is configured to move the guide plate between the extended position and the retracted position.

10. The tubular centralizer of claim 9, further comprising a hydraulic adjustment, wherein the hydraulic adjustment selectively permits fluid communication to the piston assembly.

11. A tubular centering system, comprising:

a hydraulic spider, wherein the hydraulic spider comprises a bore; and a plurality of centralizers coupled to the hydraulic spider, wherein each of the plurality of centralizers comprises:

a housing comprising a plurality of adjustment pin holes;

a guide plate at least partially disposed within the housing and movable between a retracted position and an extended position, wherein the guide plate comprises a plurality of adjustment pin slots;

a pin positioned in a first adjustment pin hole of the plurality of adjustment pin holes and a first adjustment pin slot of the guide plate, wherein a length of the first adjustment pin slot within which the pin is positioned sets a limit of the extended position and the retracted position; and a piston assembly configured to move the guide plate between the extended position and the retracted position.

12. The tubular centering system of claim 11, wherein the pin is positionable in a second adjustment pin hole and a second adjustment pin slot, and wherein a length of the second adjustment pin slot within which the pin is positioned sets a limit of a second extended position and a second retracted position.

13. The tubular centering system of claim 12, wherein:

the first adjustment pin hole is at a first axial position in the housing and the first axial position also sets the limit of the extended position and the retracted position; and the second adjustment pin hole is at a second axial position in the housing and the second axial position also sets the limit of the second extended position and the second retracted position.

14. A tubular centralizer, comprising:

a housing comprising a plurality of adjustment pin holes;

a guide plate at least partially disposed within the housing and movable between a retracted position and an extended position, wherein the guide plate comprises a plurality of adjustment pin slots;

a pin positioned in a first adjustment pin hole of the plurality of adjustment pin holes and a first adjustment pin slot of the guide plate, wherein a length of the first adjustment pin slot within which the pin is positioned sets a limit of the extended position and the retracted position of the guide plate; and a friction plate disposed on the guide plate, wherein the friction plate comprises a plurality of friction plate slots disposed therethrough.

15. The tubular centralizer of claim 14, wherein the pin is disposed through a first friction plate slot of the plurality of friction plate slots.

16. The tubular centralizer of claim 14, wherein the plurality of adjustment pin holes are disposed through a top surface of the housing, and wherein the tubular centralizer further comprises a plurality of bottom adjustment pin holes disposed through a bottom surface of the housing.

17. A tubular centralizer, comprising:

a housing comprising a plurality of adjustment pin holes;

a guide plate at least partially disposed within the housing and movable between a retracted position and an extended position, wherein the guide plate comprises a plurality of adjustment pin slots;

a pin positioned in a first adjustment pin hole of the plurality of adjustment pin holes and a first adjustment pin slot of the guide plate, wherein a length of the first adjustment pin slot within which the pin is positioned sets a limit of the extended position and the retracted position of the guide plate; and a piston assembly, wherein the piston assembly is configured to move the guide plate between the extended position and the retracted position.

18. The tubular centralizer of claim 17, further comprising a hydraulic adjustment, wherein the hydraulic adjustment selectively permits fluid communication to the piston assembly.

19. The tubular centralizer of claim 17, wherein the plurality of adjustment pin holes are disposed through a top surface of the housing, and wherein the tubular centralizer further comprises a plurality of bottom adjustment pin holes disposed through a bottom surface of the housing.

* * * * *